United States Patent
McPherson (10) Patent No.: US 9,761,210 B2
(45) Date of Patent: Sep. 12, 2017

(54) CONTROL METHODS FOR MUSICAL PERFORMANCE

(71) Applicant: Queen Mary University of London, London (GB)

(72) Inventor: Andrew McPherson, London (GB)

(73) Assignee: QUEEN MARY UNIVERSITY OF LONDON, London (GB)

(*) Notice: Subject to any disclaimer, the term of this patent is extended or adjusted under 35 U.S.C. 154(b) by 26 days.

(21) Appl. No.: 14/910,928

(22) PCT Filed: Aug. 27, 2014

(86) PCT No.: PCT/GB2014/052596
§ 371 (c)(1),
(2) Date: Feb. 8, 2016

(87) PCT Pub. No.: WO2015/028793
PCT Pub. Date: Mar. 5, 2015

(65) Prior Publication Data
US 2016/0210950 A1 Jul. 21, 2016

(30) Foreign Application Priority Data
Aug. 27, 2013 (GB) .................................. 1315228.5

(51) Int. Cl.
*G10H 1/02* (2006.01)
*G10H 7/00* (2006.01)
(Continued)

(52) U.S. Cl.
CPC ........... *G10H 1/34* (2013.01); *G06F 3/03547* (2013.01); *G06F 3/04883* (2013.01);
(Continued)

(58) Field of Classification Search
CPC .. G10H 1/34; G10H 1/0066; G10H 2220/096; G10H 2220/161;
(Continued)

(56) References Cited

U.S. PATENT DOCUMENTS

| | | |
|---|---|---|
| 2003/0015087 A1 | 1/2003 | Haken |
| 2012/0192119 A1 | 7/2012 | Zaliva |
| 2012/0194454 A1 | 8/2012 | Margalit et al. |

OTHER PUBLICATIONS

Moog, Robert A. et al., "A Multiply-Touch-Sensitive Clavier for Computer Music Systems", International Computer Music Conference, Jan. 2, 1982 (Jan. 2, 1982), XP055148894, (pp. 601-605, 5 total pages).
(Continued)

*Primary Examiner* — Jeffrey Donels
(74) *Attorney, Agent, or Firm* — Buckley, Maschoff & Talwalkar, LLC (57) ABSTRACT

A method for generating music is provided, the method comprising receiving, on a capacitive touch sensitive interface such as a keyboard, multi-finger gesture inputs having a first component and a second component, wherein the second component has a temporal evolution such as speed; determining the onset of an audio signal, such as a tone, based on the first component, analyzing the temporal evolution of the second component to determine MIDI or Open Sound Control OSC instructions; modifying the audio signal based on the instructions, in particular by decoupling the temporal relationship between specific gesture inputs (e.g. at key onset, during a note and upon key release), thus mapping gesture and motion inputs, to thus obtain previously unachievable musical effects with music synthesizers.

28 Claims, 5 Drawing Sheets

Order of operations for effect applied at note release (51) Int. Cl.
*G10H 1/34* (2006.01)
*G06F 3/0354* (2013.01)
*G06F 3/0488* (2013.01)
*G10H 1/00* (2006.01)

(52) U.S. Cl.
CPC . *G10H 1/0066* (2013.01); *G06F 2203/04808* (2013.01); *G10H 2220/096* (2013.01); *G10H 2220/161* (2013.01); *G10H 2220/241* (2013.01); *G10H 2220/271* (2013.01); *G10H 2220/391* (2013.01); *G10H 2240/205* (2013.01); *G10H 2250/081* (2013.01)

(58) Field of Classification Search
CPC ....... G10H 2220/241; G10H 2220/391; G10H 2220/271; G10H 2240/205; G10H 2250/081; G06F 3/03547; G06F 3/04883; G06F 2203/04808
USPC .......................................................... 84/627
See application file for complete search history.

(56) References Cited

OTHER PUBLICATIONS

McPerson, Andrew et al., "Design and Applications of a Multi-Touch Musical Keyboard", Jan. 1, 2011 (Jan. 1, 2011), in Proc SMC, XP05148612, 7pgs.
McPherson, Andrew "TouchKeys: Capacitive Multi-Touch Sensing on a Physical Keyboard", May 21, 2012 (May 21, 2012), XP055148606, 4pgs.
Wanderley, Marcelo M. et al., "Gestural Research at IRCAM: A Progress Report", Gesture Workshop, Feb. 1, 1998 (Feb. 1, 1998), XP055149780, 8pgs.
Heinrichs, C. et al., "A hybrid keyboard-guitar interface using capacitive touch sensing and physical modeling", Sound and Music Computing, Jan. 1, 2012 (Jan. 1, 2012), XP055148663, 9pgs.
"PCT Search Report", Patent Cooperation Treaty, dated Dec. 15, 2014 (Dec. 16, 2014), for International Application No. PCT/GB2014/052596, 8pgs.
"PCT Written Opinion of the International Searching Authority", Patent Cooperation Treaty, dated Dec. 15, 2014 (Dec. 16, 2014, for International Application No. PCT/GB2014/052596, 10pgs.

*Order of operations for effect applied at note onset*

FIG. 4

*Order of operations for effect applied at note release*

FIG. 5

Simultaneous adjustment
of knob and touch sensor

*Diagram and order of operations
for control dimension assignment
by demonstration*

CONTROL METHODS FOR MUSICAL PERFORMANCE

CROSS-REFERENCE TO RELATED APPLICATION

This application is a U.S. National Stage filing under 35 U.S.C. §371 and 35 U.S.C. §119, based on and claiming benefit of and priorities to PCT/GB2014/05296 filed Aug. 27, 2014, which claimed priority to GB Patent Application No. 1315228.5 filed Aug. 27, 2013.

FIELD OF THE INVENTION

The present invention relates to the provision of control methods for generating audio signals. In particular, but not exclusively, the present invention relates to control methods in which additional control can be provided on keyboard instruments.

BACKGROUND OF THE INVENTION

Capacitive touch sensing is increasingly used in musical controllers, particularly those based on multi-touch screen interfaces. However, in contrast to the venerable piano-style keyboard, touch screen controllers lack the tactile feedback many performers find crucial.

The TouchKeys (described, for example, in A. McPherson. TouchKeys: capacitive multi-touch sensing on a physical keyboard. Proc. New Interfaces for Musical Expression, Ann Arbor, Mich., USA, 2012) are a set of hardware sensors which attach to the surface of an existing keyboard, and which use capacitive touch sensing to measure the position and contact area of the fingers on the key surfaces (up to 3 touches per key, in 2 dimensions). Further relevant work is the development of a keyboard measuring continuous key angle rather than the more typical note onsets and releases (McPherson and Kim, "Augmenting the acoustic piano with electromagnetic string actuation and continuous key position sensing", Proceedings of the 2010 Conference on New Interfaces for Musical Expression).

Other relevant prior art includes the Moog Multiply-Touch-Sensitive keyboard from 1990, which used a capacitive sensing arrangement to measure finger position, the Endeavour Evo touch-sensing keyboard (2012; endeavour.de), the Roli Seaboard musical controller (2012; weareroli.com), and the Haken Continuum controller (2007; hakenaudio.com).

SUMMARY OF INVENTION

According to a first aspect of the present invention, there is provided a method for generating an audio signal comprising: receiving an input having a first component and a second component, wherein the second component has a temporal evolution; determining an audio signal based on the first component; analysing the temporal evolution of the second component to determine an instruction; and modifying the audio signal based on the instruction.

The present invention can take an input having multiple components and analyse the temporal evolution of at least one of these components to apply a modification to an audio signal selected through another component. Thus, an instrumentalist can select a note having various fundamental properties, such as pitch and volume, and apply an intuitive performance effect to the note through a second component of an input which evolves in time. In this manner, the range of effects achievable through the second component can extend beyond direct mapping between instantaneous input values and instantaneous output values (input x results in modified pitch equalling original pitch plus y, for example) to a more subtle and expressive ability to influence the ultimate output (variation in input x results in selection of effect y to apply to the original output, for example). In particular, the present invention can decouple the timing of the second component from the timing of the effect it has upon the output since it does not analyse the instantaneous value of the second component but its temporal evolution.

The input may be sensor data, such as touch sensor data, and may comprise touch sensor data received from a capacitive touch sensor. Capacitive touch sensors can provide a particularly responsive reflection of user activity upon an input device, such as a key of a keyboard. Additionally or alternatively, other sensor data can be used, such as that received from a camera, a capacitive or optical proximity sensor or a force sensor.

In preferred embodiments, the input is made to a musical keyboard or keyboard like interface. Preferably, the musical keyboard comprises at least one touch sensor connected to keys of the musical keyboard. The first input may comprise the selection of a key on the keyboard. The second component may comprise at least one of: the angle at which a user's finger strikes a key, the velocity at which the user's finger strikes a key, the position of the user's finger on an axis, the direction of movement of the user's finger along the axis, the speed of movement of the user's finger along the axis, and the number of fingers which strike a key and a profile of vertical finger motion. Additionally or alternatively, the second component of the input may comprise at least one of: the angle at which a finger is released from a key, the addition or removal of fingers at the time of release of a key and maintaining an intermediate key position. The first and second component of the input may be made on the same key or different keys of the keyboard.

The present invention can find particularly applicability in the context of keyboard or keyboard-like instruments, in which conventional approaches respond to certain aspects of the manner in which a user interacts (such as the timing and force with which a particular key is selected) but do not make use of additional information available through user interaction (such as the position of the users finger upon the key or the number of fingers used to select a key). By analysing the temporal evolution of these additional factors, embodiments of the present invention can apply complex musical effects in an intuitive manner.

In preferred embodiments, the instruction comprises Open Sound Control (OSC) data. The instruction may alternatively or additionally comprise Musical Instrument Digital Interface (MIDI) data. MIDI data may be effective to control the audio signal; and modifying the audio signal may comprise combining OSC data with the MIDI data. OSC and MIDI are well understood standards in the art and their adoption can improve interoperability with existing hardware and software components.

In preferred embodiments, the analysing comprises identifying a spatial region at which the second component of the input is received. Alternatively or additionally, the analysing may comprise simulating a virtual moving object to determine the instruction. In this manner, aspects of the second component can be used to simulate a physical action not present or not entirely present in the input itself in order to identify an appropriate instruction to modify the audio signal. The step of analysing may comprise calculating features of the second component of the input. In this manner, individual aspects of the input can be identified in order to select an appropriate instruction.

In preferred embodiments, the analysing comprises using a lookup table or driving a state machine to determine the instruction. These techniques can swiftly identify appropriate instructions to modify the audio signal.

The audio signal may comprise data describing at least one of articulation, pitch, volume, timbre, phrasing and release behaviour. The method may further comprise generating an audio output based on the audio signal. The audio output may be a simulation of a musical instrument.

In preferred embodiment, the input comprises a number of frames. This enables temporal evolution over the course of such frames to be analysed. Each of the number of frames may be synchronised with a system clock. As such, consistent timing can be applied both to analysis of the input and the audio signal.

In preferred embodiments, a moving average filter may be applied to the input to reduce jitter. Thus, insignificant and/or unwanted variations in the user input can be ignored when the input is analysed.

In some preferred embodiments, the second component of the input is received at one or more of the onset, the middle or the release of a musical note. These are timing within the note at which it is intuitive to a user to apply a musical effect or variation.

In preferred embodiments, the step of modifying the audio signal may comprise applying a discrete sonic event to the signal. For example, the sonic event may have a defined or determined duration in time. This contrasts with approaches in which the duration of a modification to an audio signal depends upon future input actions (for example, a pitch change until an input is released). Instead, the present invention may apply effects to the audio signal which have their own defined temporal evolution. The step of modifying the audio output and the input may not be synchronised in time.

In some preferred embodiments, the instruction is selected in dependence on an association between the second component and a selected modification established by varying a control input associated with the selected modification simultaneously with varying the second component. In this manner, a user may define the modification applied by later variation of the second component by associating it with a particular selected modification associated with an existing control input. Indeed, this concept is novel in itself, and the present disclosure also provides a method of selecting a modification of an audio signal associated with a component of an input, comprising varying the component of the input simultaneously with varying a control input associated with a predefined modification, and assigning the predefined modification to the component.

According to a second aspect of the present invention, there may be provided an apparatus configured to perform the method of the first aspect. For example, the apparatus may comprise: an input device for receiving an input comprises a first component and a second component having a temporal evolution; and a processing unit for determining an audio signal based on the first component; analysing the temporal evolution of the second component to determine an instruction; and modifying the audio signal based on the instruction.

According to a third aspect of the present invention, there may be provided a computer readable medium containing code arranged to perform the method of the first aspect when run on a computer. The computer readable medium may be a physical storage medium such as a Read Only Memory (ROM) chip or Flash memory chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above

BRIEF DESCRIPTION OF THE DRAWINGS

Exemplary embodiments of the present disclosure shall now be described with reference to the drawings in which.

Throughout the description and the drawings, like reference numerals refer to like parts.

SPECIFIC DESCRIPTION

Compared to existing commercial keyboard solutions where external wheels or pedals are used to shape notes after they are played, the present disclosure demonstrates how such expressive techniques can be executed solely through the motion of the fingers on the instrument, in most cases the same fingers that trigger the notes. A separate hand or foot is not required to execute the techniques as it is on conventional electronic keyboards. This makes the techniques far more practical and accessible.

The present disclosure proposes a series of mappings (relationships) between the player's finger motion and the sonic properties of various synthesizers. "Synthesizers" here is used to mean any electronic sound producing device, which might be implemented in software or in hardware. An electronic simulation of the sound of a violin, for example, would be considered a synthesizer for this discussion. Compared to mappings presented in earlier publications by the inventor and others, the present disclosure presents specific new actions the player can take to control the sound of a synthesizer. The present disclosure moves beyond simple one-to-one mappings between instantaneous position and instantaneous sonic parameters and focuses on decoupling their temporal relationship, as well as introducing specific actions at the onset and release of notes to produce previously unachievable musical effects.

Figure 1:
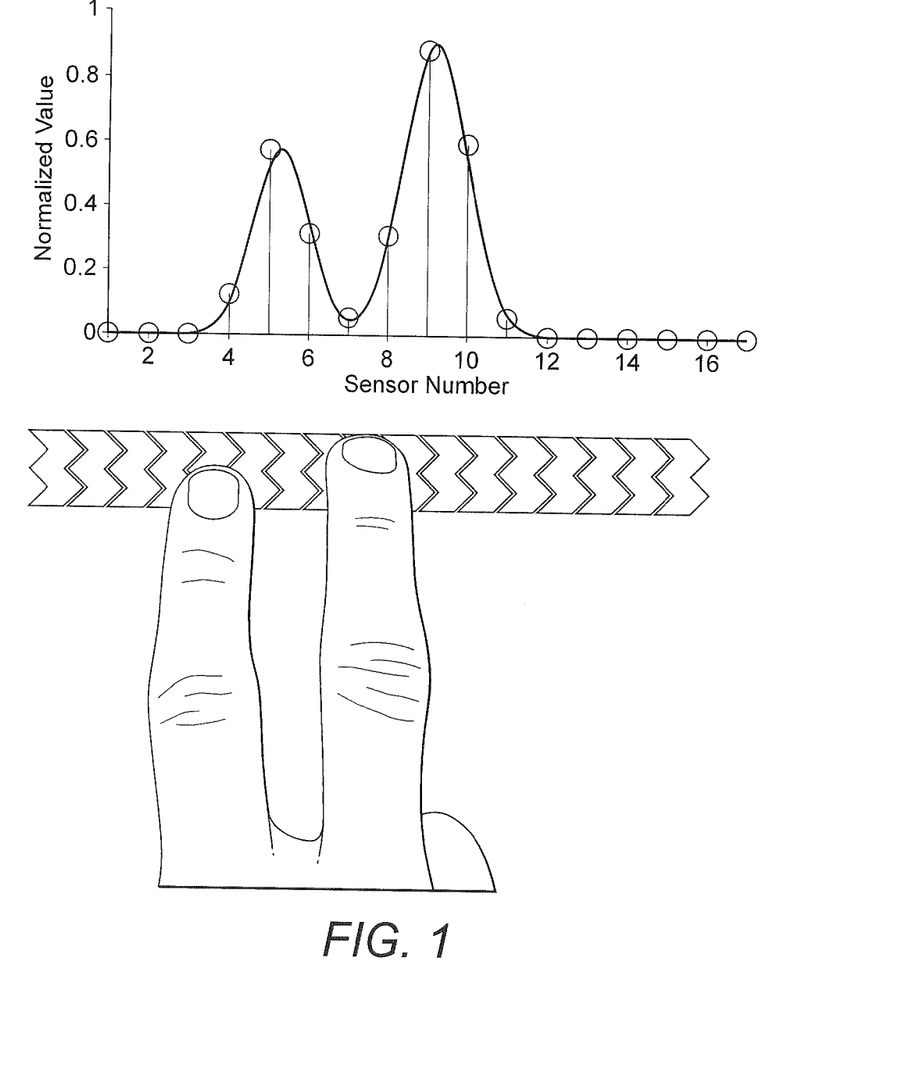
FIG. 1 shows an arrangement of sensors and their associated measurements.

Capacitive touch sensing allows high-precision tracking of a user's finger motion with no electrical contact between user and device. A conductive plate forms a capacitor with the surrounding free space and ground layers. Objects which are conductive or have a substantially different dielectric constant than air, when brought into proximity with the plate, will change its capacitance. Capacitance values are typically measured either by charging the plate to a known voltage and measuring discharge time in an RC circuit, or by measuring its frequency response in a resonant circuit. The capacitance of a single sensor can be read as a continuous value which roughly corresponds to the proximity and size of nearby objects. To measure position, an array of discrete sensors is required (FIG. 1 bottom). Sensors are measured one at a time, with the remaining sensors tied to ground. A finger touch will activate several adjacent sensors, from which a centroid value (weighted average) can be calculated (FIG. 1 top). Because the sensor values are continuous, position resolution can far exceed the number of sensor elements in the array. Though more complex to implement than resistive position sensors, capacitive sensing has the advantage of requiring no finger pressure (indeed no contact at all) to operate. With certain sensor configurations, multi-touch capability is also supported, where resistive sensors are limited to at most one or two points of contact. Capacitive sensing can be combined with existing pressure (after-touch) keyboard systems and, unlike after-touch, both pressed and unpressed keys can be read.

Figure 2:
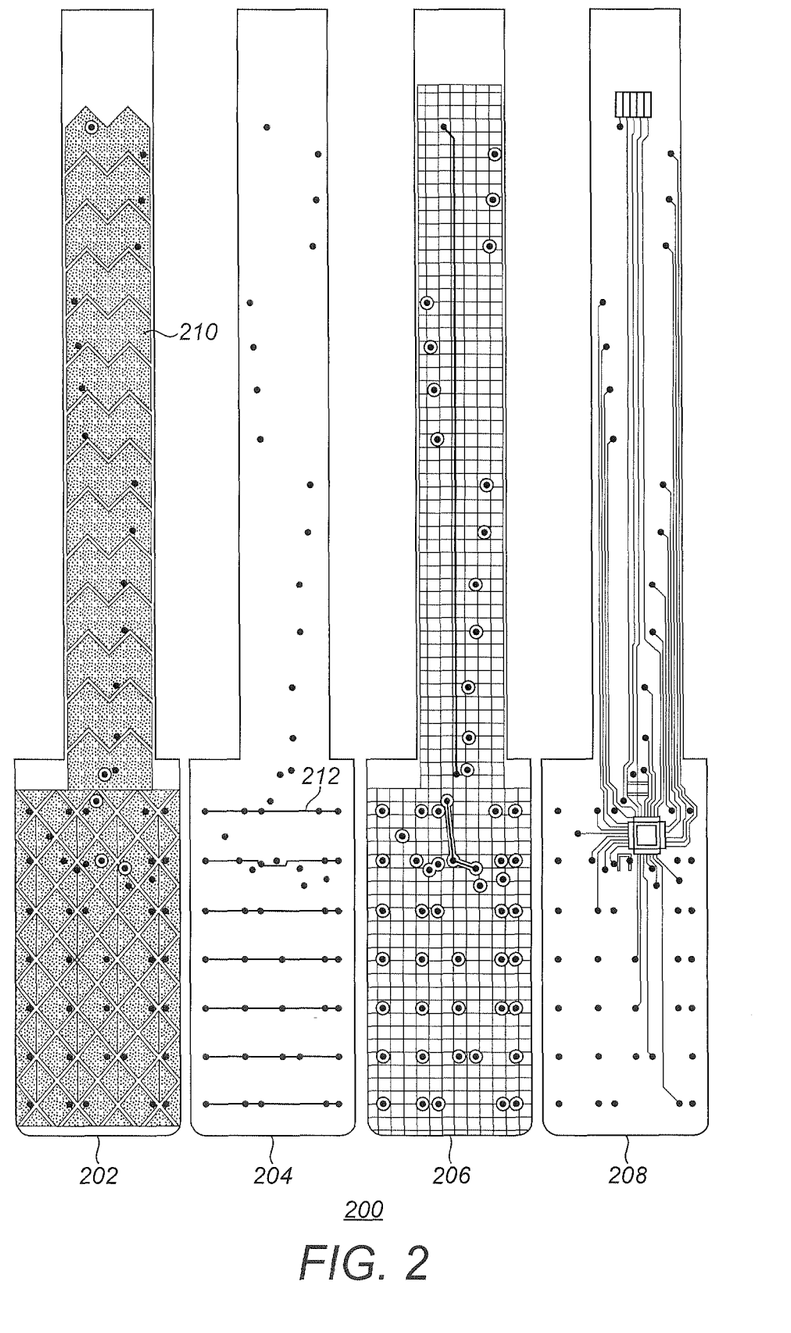
FIG. 2 shows a printed circuit board layout for TouchKey keyboard keys.

FIG. 2 shows the printed circuit board layout for a key 200. The board has four layers, 202, 204, 206, 208. The top layer 202 contains sensor pads 210; the layer beneath 204 contains traces 212 connecting rows of pads in the two-dimensional grid; the third layer 206 is a hatched ground plane, and the bottom layer 208 contains the components and most signal traces. The components may include a microcontroller, resistors, capacitors and connectors.

Figure 3:
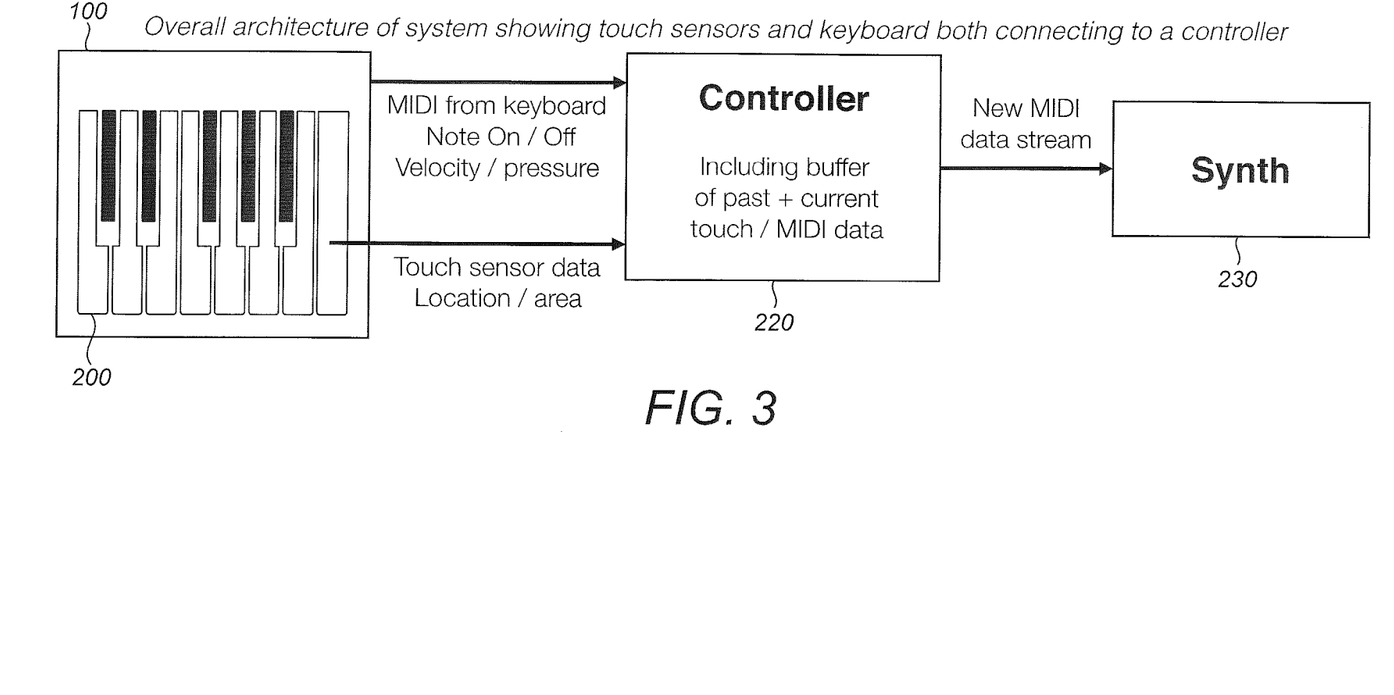
FIG. 3 shows the architecture of a system for controlling audio signals.

FIG. 3 shows the overall architecture of a system for controlling an audio signal. Keyboard or keyboard like interface 100 has a number of keys 200. Each key 200 may be implemented in the same manner as key 200 described above in relation to FIG. 2. Keyboard 100 can be connected to a controller 220 and may send MIDI and touch sensor data to controller 220. Controller 220 may act as a processing unit and analyse the received data and output MIDI data to a synthesiser 230.

Capacitive touch sensors measure a player's physical movements. A mapping is a relationship between these movements and the sound produced by the instrument. Existing mappings include pitch bends, vibrato, simulations of plucking virtual strings where the pluck location matches the location of the player's touch, and controls for analogue synthesizers (or emulations thereof) where touch position or contact area affects oscillator or filter settings. A general feature of these prior mappings is that they are one-to-one in time; in other words, the instantaneous location of the finger on the sensor surface determines a particular parameter of the audio production at that exact moment in time. Indeed, most of the academic literature on mapping in musical performance works on the assumption that the instantaneous value a particular sensor affects the instantaneous value of a particular sound parameter.

The control methods for expressive musical performance presented herein may be performed on a musical keyboard or keyboard-like interface. The instrument in question could be a touch-sensing keyboard like the TouchKeys; a keyboard-like instrument like the Haken Continuum or Roli Seaboard; an isomorphic button interface like the Snyderphonics Manta; a touchscreen app for iPad or iPhone; or possibly other novel instruments.

[Input movements and output effects]

The mappings in the present disclosure address several properties of the player's movements. Examples of player movements that can be used are:

Specific intentional finger movements at the beginning (onset) of a note.
Continuous finger motion and discrete fingering patterns in the middle of a note.
Specific intentional finger movements at the end (release) of a note.

In turn, these mappings may control various aspects of a synthesizer. Examples of these are:

Articulation, or the specific transient properties of the sound at, and immediately after, the onset of a note.
Pitch, or the frequency of a note, including continuous variations in pitch across the duration of the note.
Volume, or the loudness/amplitude of a note, including continuous variations across the duration of the note.
Timbre, or the tone quality of a note, including its audio spectral properties; also continuously variable across a note.
Phrasing, involving the manner in which one note connects to another in sequence.
Release behaviour, or the way that the sound of a note finishes.

One goal of the proposed mappings is to allow a keyboard player to execute expressive techniques previously only available on other instruments (e.g. strings, winds), and to do so solely by how the fingers move on the instrument surface without the aid of the external control wheels or pedals found on some keyboards.

[Mappings at Note Onset]

When considering the use of finger movement at note onset to control a synthesizer, the following properties of a player's movement may be used to affect the sound of a note:

The angle at which the finger strikes the key, as measured by the change in finger position immediately before or during the time the note begins.
The number of fingers with which the player strikes the key, and the order of their placement.
The profile of vertical finger/key motion.

Regarding the angle at which the finger strikes the key, two or more points are measured to calculate a velocity of finger movement (in either front/back or side/side plane) at the time the note is beginning; on a physical keyboard, "onset" corresponds to the time that the key is first moving down, but the same principle could apply to a keyboard-like interface without moving keys. This measurement is especially well suited to controlling subtle variations in pitch and timbre at the beginning of a note.

Regarding number and order of fingers with which the player strikes the key, the keyboard or controller may measure multiple touches on the same key. One or more samples in time are taken before or during the note onset to determine how many fingers are present at note onset; a specific case involves taking two or more samples in time to determine in what order multiple fingers were placed on the key, and what their relative spacing and time of onsets were. For example, a note struck with two fingers in quick succession might produce a different sound than a note struck with one finger or a note struck with two simultaneous fingers. This measurement is well suited to controlling the articulation, timbre and volume of a note at onset.

For the profile of vertical finger/key motion, this information would be derived from two or more measurements of key angle as the key is moving when performed on a keyboard with continuous key angle sensing. On other instruments, any sensor technology capable of measuring the vertical location of the finger (e.g. optical/camera tracking, capacitive proximity, or force measurement) might be similarly used. Velocity of key press is commonly used in nearly all keyboard instruments, but the measurement here specifically relates to variations in the speed and position of the key as it goes on. For example, a key press exhibiting a continuous acceleration over time, with the highest velocity at the end of the onset, might produce a different sound than a key press in which the velocity suddenly spiked but grew gradually lower as the key reached the bottom of its range of motion. This technique is well suited for controlling the articulation of a note (those qualities which go beyond simple velocity or volume).

[Mappings during a Note]

When considering the use of finger motion in the middle of a note to control a synthesizer, the following techniques may account for the profile of a player's motion over time to create new musical effects beyond previously available one-to-one mappings:

Simulation of virtual moving objects in tracking finger motion.

Triggers for discrete sonic events within a note.

Suppose the player moves the finger upwards along a key while it is held. Rather than simply following the instantaneous position of the finger to control a synthesizer, the system might simulate the motion of a virtual object "thrown" by the finger as it moves, where the object continues moving with gradually decreasing speed after the finger stops. The position of this virtual object is in turn used to control a particular property of a synthesizer, for example its pitch or an aspect of its timbre. A variation on this technique is to simulate the motion of a virtual mass attached by a spring to the player's finger: when the finger moves, the virtual mass is initially slow to respond, and when the finger stops moving, the virtual mass continuous moving but is gradually pulled back to the location of the finger. Again here, the location of the virtual mass and not the location of the finger itself controls an aspect of the synthesizer sound. The motion of the virtual object could conceivably be in any of the three spatial dimensions or a combination of them.

Examples of triggers for discrete sonic events within a note include adding or removing a finger from a key while a note is in progress, executing a sudden rapid change in position, a sudden pinch between two fingers (bringing them closer together or farther apart), or tapping with an extra finger on a key two or more times while it is held down. In each of these cases, it is not the instantaneous finger position or number of fingers that is significant to the synthesizer; rather, each of these gestures represents a discrete "trigger" that causes a particular change in the synth sound. The change in sound might represent an extended technique of a non-keyboard instrument, for example the sound of slapping the strings on an upright bass or activating a harmonic through amplifier feedback on an electric guitar. Once the new behaviour is triggered, it can persist for the remainder of the note, or the note can return to its original state at a later time.

[Mappings at Note Release]

When considering the use of finger motions at the end of a note to control a synthesizer. When a note ends, either giving way to silence or to another note, the following aspects of a player's movement can control the sonic properties of the note:

The angle at which the finger leaves the key, as measured by the change in finger position immediately before and during the note release.

The addition or removal of fingers at the time of note release.

Maintaining a key in an intermediate state at release.

The angle at which the finger leaves the key is the counterpart to the angle at which the finger strikes the key as set out above, and also requires two or more measurements of the finger position to calculate a velocity. This measurement is especially well-suited to controlling subtle changes in pitch at the end of a note as commonly found on string and wind instruments and the human voice, but it can also be used to control changes in volume and timbre at the end of a note or the way that one note transitions to another (phrasing).

At the moment the key is released, the player may add or remove fingers from the key surface to trigger different sounds at release. These are similar to the triggers described above but specifically concern the player's actions at the time of release. A special case involves tapping multiple times on the key at release, where the location and timing of the taps would change the sound of the note release. These techniques are particularly well-suited to simulating stylised extended techniques of non-keyboard instruments, for example "buzzes" and "falls" on brass instruments.

On a keyboard with continuous vertical position sensing, a state might be implemented between "note on" (i.e. when the key is all the way down) and "note off" (when the key is all the way up) where the sound of the synthesizer continues but with different properties than were present when the note was on. In this technique, a player would play a note but on releasing it, would hold the key partway down for a period of time before releasing it entirely. A well-suited application of this technique would be the control of synthesizers which model bowed string instruments. The "note on" state would correspond to active bowing of the string, as it does in current practice. The intermediate state would allow the string to keep ringing but discontinue the active bowing, where the "off" state would stop the string from vibrating.

[Further Mappings]

A further property of the player's movement that can be exploited is the use of finger motions on adjacent keys to control properties of a particular note. Suppose a note is being played on a particular key of a keyboard. Then the sonic properties of that note on the synthesizer could be controlled not just by finger motion on that particular key, but also motion of the fingers on surrounding keys that are not pressed. This is especially suitable for touch-sensing keyboards like the TouchKeys where measuring finger-key contact is independent of physically pressing the key. Properties that could affect the sound of the synthesizer including how many adjacent keys are touched and how far the keys are from the target note, or how the finger moves on the adjacent keys. For example, with one note held, moving the finger on an adjacent unpressed key could change the timbre of the target note in a different way than moving the finger on the key of the main note itself.

The simulation of specific extended techniques from non-keyboard instruments using a keyboard-like interface with touch-sensing capability can also be achieved. Using the techniques described above, commonly-used expressive techniques on string, wind and brass instruments could be simulated on synthesizers which emulate the sound of these instruments.

On strings, this includes selecting between bowed and plucked notes on a key-by-key basis depending on the motion of the finger; adjusting the bow position or pressure on the string in real time in response to finger motion; simulating different forms of bow articulation such as spiccato and martele; playing harmonics; and playing different forms of expressive portamento (pitch variation) at the beginning of a note depending on the motion of the finger.

On winds and brass, this includes simulating "scoops" (expressive pitch bends where a note begins below the expected pitch and rises immediately after only); "falls", "doits" and "buzzes" (drops or occasionally rises in pitch at the end of a note, executed on wind instruments with the mouth or with the fingers); changing the timbre of a note by simulating changes in embouchure (mouth position); key clicks; and flutter-tongue or "growl" effects.

All of these can be triggered by specific motions of the fingers as captured by a touch-sensing keyboard or keyboard-like instrument, rather than current solutions which use separate controls to trigger these effects.

[Methods]

In operation, a user makes an input on the keyboard, for example, by pressing a key. This input has a first component and a second component, and the second component has a temporal evolution. The first component may be, for example, the downward pressing of a key and may result in the production of MIDI data relating to a musical note. The second component may be, for example, the movement of the finger along the key, the movement of a second finger on the key, or any other possible touch input. Subsequently, the first input is used to determine an audio signal. This may be, for example, a musical note. The musical note may have a profile which defines the sound of that note in terms of various parameters, for example articulation, pitch, volume, timbre, phrasing and release behaviour. The temporal evolution of the second component of the input is analysed to determine an instruction. This may involve, for example, determining the angle at which the finger strikes the key to control variations in pitch at the beginning of a note. The audio signal determined from the first component of the input is then modified based on the instruction determined from the analysis of the second component of the input. This modification may result in a musical effect being added to the basic sound of the note determined by the first component of the input or may result in an entirely different audio signal being generated. The resultant effect may have a temporal profile of its own.

Figure 4:
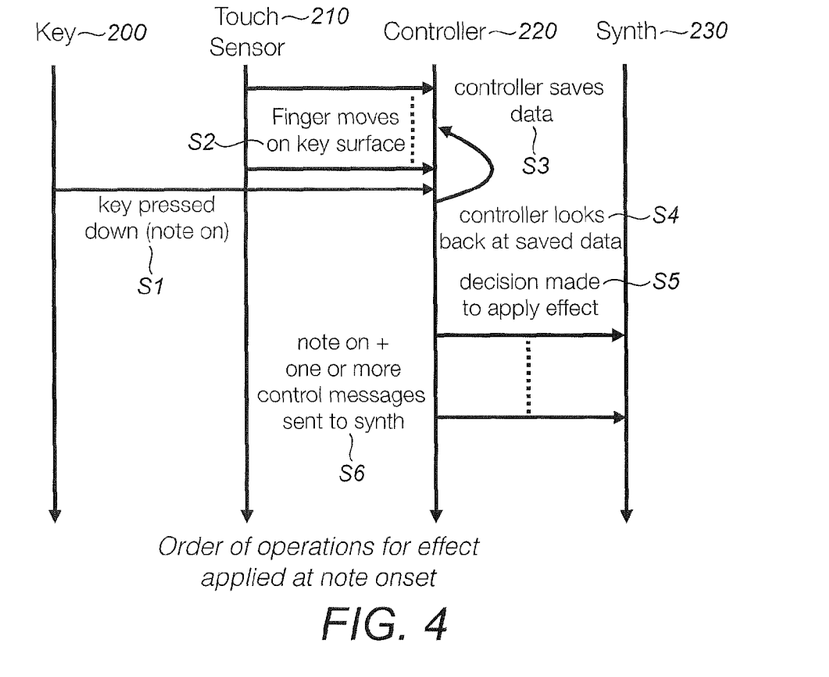
FIG. 4 shows a process for controlling audio signals.

FIG. 4 shows an example of how such a method may be implemented on the system disclosed above, in particular to apply an effect at the onset of a note. At step s1, a key 200 is pressed down, corresponding to a "note on" command. This corresponds to the first component of the input. At step s2, the user's finger moves along the surface of the key 200 and is sensed by touch sensor 210. This corresponds to the second component of the input. At step s3, the controller 220 saves the data generated in steps s1 and s2. At step s4, the controller looks back at the saved data, and analyses the temporal evolution of the second component (i.e. the temporal evolution of the position of the user's finger on the key). At step s5, a decision is made to apply a certain effect to a musical note based on an instruction selected according to the temporal evolution of the second component. At step s6, the "note on" signal is sent to the synthesiser 230 along with one or more control messages associated with the determined instruction. The method may then continue to modify the musical note associated with the "note on" command based on the control messages. In this manner, effects such as those described in the section above entitled "Mappings at note onset" can be applied to the output.

Figure 5:
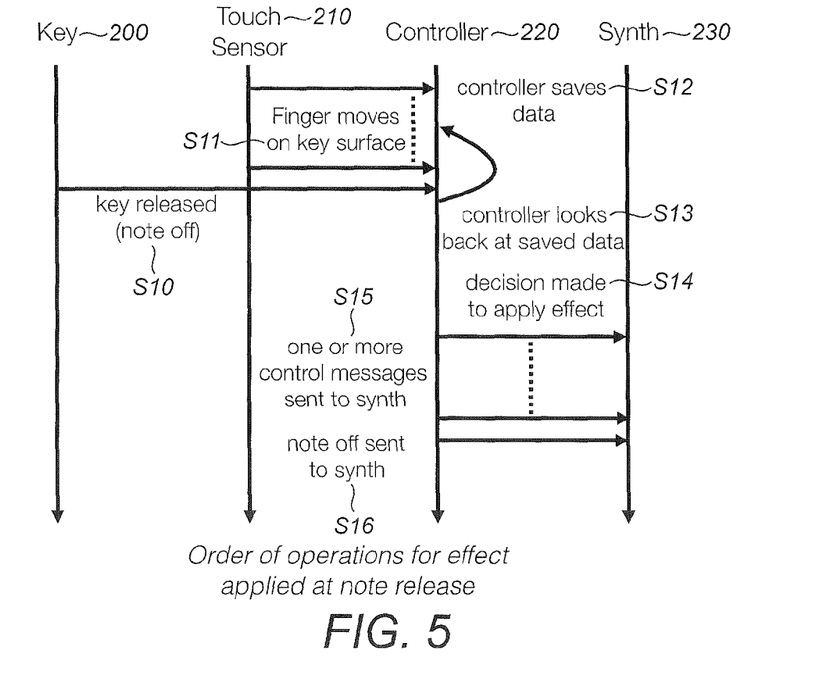
FIG. 5 shows a process for controlling audio signals.

FIG. 5 shows another example of how a method may be implemented on the system disclosed above, in particular to apply an effect at the release of a note. At step s10, a key 200 is released, corresponding to a "note off" command. This can be understood as the first component of the input. At step s11, the user's finger moves along the surface of the key 200 and is sensed by touch sensor 210. This provides the second component of the input. At step s12, the controller 220 saves the data generated in steps s10 and s11. The saved data reflects the temporal evolution of the second component. At step s13, the controller looks back at the saved data in order to analyse the temporal evolution of the second component of the input. At step s14 a decision is made to apply a certain effect to a musical note based on an instruction selected according to the temporal evolution of the second component. At step s15, one or more control messages associated with the determined instruction are sent to the synthesiser 230. At step s16, the "note off" signal is sent to the synthesiser 230. The method may then continue in order to modify the ending of the musical note associated with the "note off" command, based on the control messages, as at operation 308. In this manner, effects such as those described in the section above entitled "Mappings at note release" can be applied to the output.

The methods and techniques described above are based on the following general data processing strategy. Given MIDI and touch sensor data from the keyboard received as first and second components of an input, the two streams may be combined into one coherent picture of the player's actions. Low latency and low jitter are preferable, so the incoming sensor data may be affixed with frame numbers to identify exactly when the data was captured in case the data was delayed within the computer operating system. These frame numbers are then synchronised with the computer system clock and a moving-average filter is used to reduce jitter in the synchronised timestamps while accounting for any drift between the clock within the touch sensor device and the main computer clock. The first and/or second components of the received input may be stored in a memory before or after a filter is applied, such that a full profile of the touch input may be accessed for analysis in order to define the instruction.

Due to the capability of capacitive touch sensors to identify a finger movement without actual contact on the key, and the inherent time taken to perform a key press, it is possible to identify and analyse the movement of a finger as a key is being pressed. The movement of the finger may be sensed as the finger approaches the key and as the key is pressed down and this input may be stored and analysed to determine a resultant sound effect before the key is fully pressed. Therefore, effects can be added to the start of the note without experiencing any discernable delay in the sound of the note being produced. Previously, this was not considered possible and therefore only one-to-one mappings between movements and effects were attempted.

The analysis of the temporal evolution of the second component of the input may include several steps. For example, when an important event occurs, such as a key press (MIDI note on) or a key release (MIDI note off), a local search is conducted on the touch data frames to identify the region of interest, for example the region where the player's finger is moving immediately before note release. From the region of interest, a small number of features may be calculated based on the touch frames. For example, prior to note onset, the average velocity of the finger, the maximum velocity and the total distance travelled might be recorded. These features then either go into a lookup table (possibly interpolated) or drive a state machine which determines the course of future output. Notably, the features do not only affect the immediate sound/MIDI output when they are calculated, but trigger behaviour which evolves on a longer timescale. For example, a scoop played by moving the finger at note onset would continue to generate pitch bend motion after the finger motion had finished.

MIDI and OSC output may be generated at a rate so as to make a smooth real-time effect. This rate may be different than the input frame rate of the touch sensors or MIDI keyboard. The input and output rates need not be synchronised at all. For example, the duration of the touch input may not match the duration of the resultant sound effect. Furthermore, the trajectory of the touch input, that is to say the speed and distance of finger movement along a key, may not match the trajectory of the resultant sound effect.

The following are specific examples of some of the cases presented above. This is far from a complete list of applications.

EXAMPLES

Example 1

Saxophone "scoop" using finger velocity at note onset. In this example, the keyboard is attached to a synthesizer that produces a saxophone sound. A "scoop" is a common jazz saxophone technique where the note begins below its normal pitch and slides into the expected pitch. In this example, a scoop is played by moving the finger along the key surface at the time of note onset. The measured finger velocity controls the intensity of the scoop. There are two defining features to this example: first, that the instrument recognises that the finger is moving and therefore starts the pitch below its expected value, and second, that the pitch may not exactly track the finger motion in time; for example, the pitch bend may last for longer than the original finger motion.

Example 2

Trumpet "fall" using finger velocity at note release. In this example, the keyboard is attached to a synthesizer that produces a trumpet sound. A "fall" is a jazz technique where the player plays a series of descending pitches by loosening the embouchure at the end of a note. There are several variations on this idea which also change the pitch at the end of a note (up or down): "buzzes", "doits" etc. In each case, such techniques are triggered by measuring the velocity of the finger as it leaves the key. If the finger remains in the same position on the key as the note ends (the usual way of playing), the note ends normally. If the finger is moving quickly across the key surface, for example if the player pulls the finger toward the body (away from the keyboard), a fall is triggered. The speed or intensity of the fall may depend on the speed of the finger or the distance it travels, but as in Example 1, there need not be a one-to-one mapping between instantaneous finger position and pitch of the note.

Example 3

Rapid bow changes on a violin using multiple fingers on the key. In this example, the keyboard is attached to a synthesizer that produces a violin sound. Rapid bowing of the same string is a common technique in many styles of music from classical to folk fiddling, but it is difficult to rapidly retrigger the same note on a keyboard. Here, placing a second finger on a key which is already held down produces a bow change sound without changing the pitch. By alternating quickly between two fingers, it is possible to produce a series of rapid bow changes.

Example 4

Wah-wah effect with built-in momentum. In this example, the touch sensors on the keyboard control a wah-wah filter effect; the synthesizer might be an electric guitar sound but any synth can be used. Here, the position of the finger along the front-back (Y) axis of the key controls the wah-wah cutoff frequency. However, rather than directly coupling finger position to cutoff frequency, they are related through a virtual spring and mass system as described above. For example, if the finger is moving and quickly stops, the wah-wah cutoff frequency may continue to move upward as if "thrown" by the finger, before gradually falling back down. Likewise, after a sudden finger motion, the wah-wah cutoff frequency might catch up with the finger only gradually, as if attached by a spring.

Figure 6:
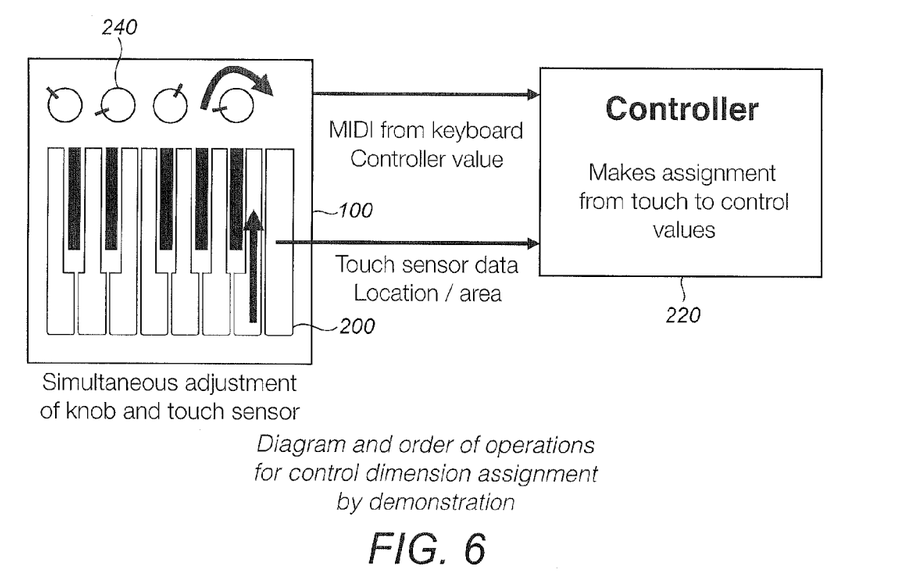
FIG. 6 shows a system for assigning controls for audio signals by demonstration.
Figure 7:
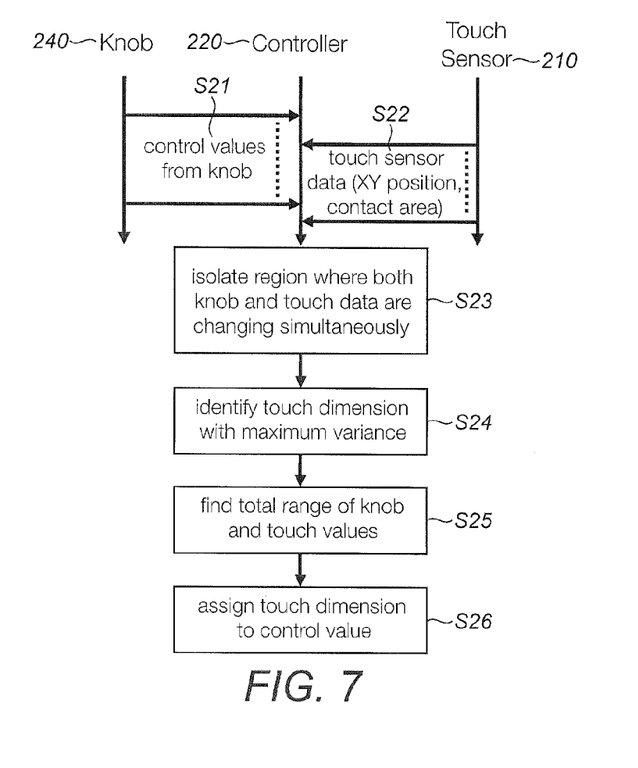
FIG. 7 shows a process for assigning controls for audio signals by demonstration.

The user may also be able to use the input methods to assign control parameters by demonstration. A system architecture and process for achieving this are shown in FIGS. 6 and 7. The methods below simplify the assignment of different finger motions to different synthesizer parameters. Referring to FIG. 6, the player may adjust a physical or on-screen control (e.g. a knob or slider 240) while simultaneously moving the finger on any key surface. The keyboard 100 may send MIDI data and touch sensor data to the controller 220. The controller 220 looks for the touch dimension with the greatest range of variation (e.g. the vertical position) and assigns that dimension to the control being adjusted. The range of finger motion and the range of output control values can be set based on the range of motion during this assignment procedure, or the range could be set to a default value (e.g. the full length of the key corresponds to the full range of the control). Referring to FIG. 7, control values from a control input such as a physical or on-screen knob or slider 240 are sent to the controller 22 at step s21. At step s22, touch sensor data (i.e. a component of the input) is sent from the touch sensor 210 to the controller 220. At step s23, the controller 220 analyses where both control values from knob or slider 240 and touch sensor data are changing simultaneously. The controller identifies which touch dimension has the greatest range of variation at step s24. The total range of control values and touch sensor values is found at step s25. At step s26, a touch dimension is assigned to a control value. By using the above system and method, mappings for musical control may be input into the system.

Alternatively, the player may play back a prerecorded track containing controller data (e.g. a MIDI track or file), moving the finger on the key synchronously with the changes of a particular control. The control in question could be selected manually by the user, or could be detected automatically by selecting the control which exhibits the greatest range of variation during the assignment procedure. The system looks for the touch dimension with the greatest range of variation and assigns that dimension to the control being adjusted. The ranges could also be set based on the range of motion or set to a default value. These methods can also be used for assigning higher-level gestures such as vibrato (a periodic back and forth motion) to controls. In this case, the system may detect the presence and amplitude of vibrato and, having detected its presence, assign this motion to the desired control rather than the raw sensor dimension.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination. It should be noted that the term "comprising" does not exclude other elements or steps, the term "a" or an does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A method for generating an audio signal comprising:
   receiving an input having a first component and a second component, wherein the second component has a temporal evolution;
   determining an audio signal based on the first component;
   analysing the temporal evolution of the second component to determine an instruction; and
   modifying the audio signal based on the instruction
   wherein the timing of receiving the input is decoupled from the timing of modifying the audio signal.

2. The method according to claim 1 wherein the input is sensor data.

3. The method according to claim 2 wherein the sensor data is touch sensor data.

4. The method according to claim 2 wherein the sensor data is received from a camera, a capacitive or optical proximity sensor or a force sensor.

5. The method of claim 3 wherein the touch sensor data is received from at least one capacitive touch sensor.

6. The method of claim 1 wherein the input is made to a musical keyboard or keyboard like interface.

7. The method of claim 6 wherein the musical keyboard comprises at least one touch sensor connected to keys of the musical keyboard.

8. The method according to claim 6 wherein the second component of the input is at least one of the angle at which a user's finger strikes a key, the velocity at which the user's finger strikes a key, the position of the user's finger on an axis, the direction of movement of the user's finger along the axis, the speed of movement of the user's finger along the axis, the number of fingers which strike a key and a profile of vertical finger motion.

9. The method according to claim 6 wherein the second component of the input is at least one of the angle at which a finger is released from a key, the addition or removal of fingers at the time of release of a key and maintaining an intermediate key position.

10. The method according to claim 6 wherein the first component of the input and the second component of the input are made on different keys.

11. The method according to claim 1 wherein the instruction comprises MIDI data and/or OSC data.

12. The method according to claim 11 wherein MIDI data is effective to control the audio signal; and modifying the audio signal comprises combining OSC data with the MIDI data.

13. The method according to claim 1 wherein the analysing comprises identifying a spatial region at which the second component of the input is received.

14. The method according to claim 1 wherein the analysing comprises simulating a virtual moving object to determine the instruction.

15. The method according to claim 1 wherein the analysing comprises calculating features of the second component of the input.

16. The method according to claim 1 wherein the analysing comprises using a lookup table or driving a state machine to determine the instruction.

17. The method according to claim 1 wherein the audio signal comprises data describing at least one of articulation, pitch, volume, timbre, phrasing and release behaviour.

18. The method according to claim 1 further comprising generating an audio output based on the audio signal.

19. The method according to claim 18 wherein the audio output is a simulation of a musical instrument.

20. The method of claim 1 wherein the input comprises a number of frames.

21. The method according to claim 20 wherein each of the number of frames is synchronised with a system clock.

22. The method of claim 1 further comprising applying a moving average filter to the input to reduce jitter.

23. The method of claim 1 wherein the second component of the input is received at one or more of the onset, the middle or the release of a musical note.

24. The method according to claim 1 wherein the modification of the audio signal is a discrete sonic event.

25. The method of claim 1 wherein the step of modifying the audio output and the input are not synchronised in time.

26. The method of claim 1 wherein the instruction is selected in dependence on an association between the second component and a selected modification established by varying a control input associated with the selected modification simultaneously with varying the second component.

27. An apparatus comprising:
   an input component for receiving an input having a first component and a second component, wherein the second component has a temporal evolution;
   a processing component in communication with the input component and configured to determine an audio signal based on the first component;
   analyse the temporal evolution of the second component to determine an instruction; and
   modify the audio signal based on the instructions;
   wherein the timing of receiving the input is decoupled from the timing of modifying the audio signal.

28. A computer-implemented method associated with an audio processing system, comprising:
   receiving, by an input device, an input having a first component and a second component, wherein the second component has a temporal evolution;

determining, by a processing device, an audio signal based on the first component;
analyzing, by a processing device, the temporal evolution of the second component to determine an instruction; and
modifying, by a processing device, the audio signal based on the instructions;
wherein the timing of receiving the input is decoupled from the timing of modifying the audio signal.

* * * * *